Dec. 8, 1936.  M. W. GANO, JR  2,063,801
TOOTH BRUSH
Filed March 16, 1936
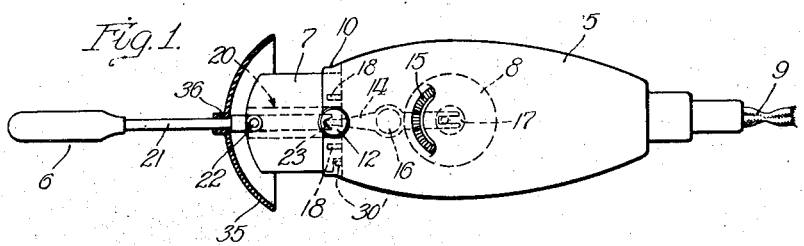
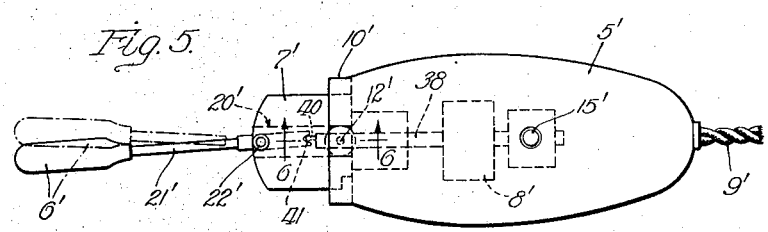
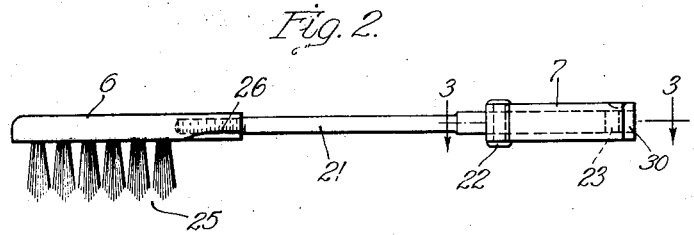
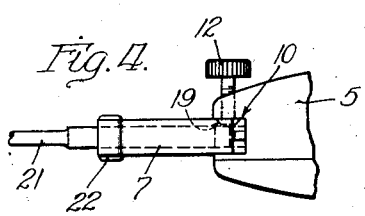
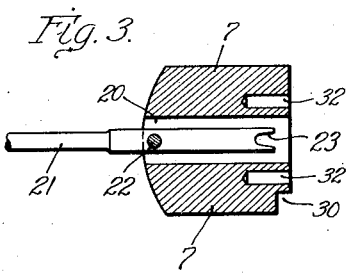
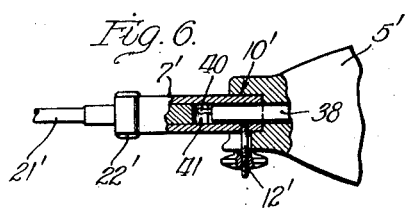
Inventor:
Merritt W. Gano, Jr.
By: Brown, Jackson, Boettcher & Dienner
Attys.

Patented Dec. 8, 1936

2,063,801

UNITED STATES PATENT OFFICE 2,063,801

TOOTH BRUSH

Merritt W. Gano, Jr., Denver, Colo.

Application March 16, 1936, Serial No. 69,085

7 Claims. (Cl. 15—22)

This invention relates to toothbrushes and has to do with an electrically driven toothbrush in which a rapid up and down reciprocation is obtained to produce the desired up and down brushing effect.

One of the objects of my invention is to provide a toothbrush of this sort of simple and inexpensive construction and which may be handled and operated conveniently and effectively.

Another object of the present invention is to provide a toothbrush of this sort which may be used with casing and handle parts similar to those employed with electric razors now well known in the art, and, in the more specific aspects of the invention, a toothbrush of this sort which is interchangeable with the cutter mechanisms of known forms of electric razors, whereby to increase the utility of devices of this sort.

While the particular devices which I shall describe hereinafter in connection with the drawing are devices which are interchangeable with the cutter mechanisms of known forms of electric razors, it is to be understood that the present invention may be interchangeable with the cutter mechanisms of other forms of electric razors, or may be used with casing and handle parts of the types shown, or with other suitable casing and handle parts without making the cutter mechanism interchangeable therewith or supplying the cutter mechanism with the toothbrush and its casing and handle part for use therewith.

Further objects and advantages of my invention will appear from the following detailed description taken in connection with the accompanying drawing, in which:

Figure 1 is a plan view, partially in section, showing a casing and handle part with a toothbrush attached thereto in accordance with the present invention;

Figure 2 is a side view of the toothbrush and attachment head for use with the casing and handle part shown in Figure 1;

Figure 3 is a fragmentary detail section taken on the line 3—3 of Figure 2;

Figure 4 is a side view partially broken away and showing the application of the toothbrush attachment head of the embodiment of the invention shown in Figure 1 to the casing and handle part;

Figure 5 is a view similar to Figure 1, partially broken away and showing a modification; and Figure 6 is a fragmentary detail section taken on the line 6—6 of Figure 5.

Referring now in detail to the drawing, the device shown in Figures 1 to 4 comprises a handle and casing part 5, a toothbrush 6, and an attachment head 7.

The particular casing and handle part shown is the casing and handle part of a "Schick" electric razor the full details of which are shown in the patent to J. Schick, No. 1,757,978, patented May 13, 1930. It is constructed to receive a suitable electric motor 8 which is connected by the electric conductors 9 to an ordinary light socket or other suitable electric outlet. The casing and handle part is preferably formed of insulating material, and has a cover which may be removed for access to the parts within the casing and handle part.

The casing and handle part 5 has the transversely channeled end 10. When the device is also adapted for use as a razor and is provided with a cutter mechanism (not shown), the outer stationary cutter head of the cutter mechanism is arranged in the channeled end 10 and held therein by a screw 12. In such case, the inner transversely reciprocable cutter has actuating arms or a socket which fits around the end of the vibrating arm 14, so that when the starting element 15 or a suitable switch is turned to position to start the motor, the arm 14 is vibrated or oscillated rapidly about its pivot 16 to reciprocate the transversely reciprocable cutter in respect to the stationary cutter head. The actuating connection between the motor 8 and the arm 14 is shown at 17 as comprising an eccentric pin on the motor shaft engaging in the notched end of the arm 14. Spring-pressed pins are provided at 18 for yieldingly holding the teeth of the inner reciprocable cutter in proper cooperating position in respect to the teeth of the outer stationary cutter head.

According to the present invention, the cutter head is removed or omitted entirely, depending upon whether the toothbrush part is marketed in conjunction with the razor or as a separate item, and the attachment head 7, which comprises a block of metal or other suitable material formed to enter the channeled end 10 of the casing and handle part 5, is inserted in the channeled end 10 and secured therein by the screw 12. The block 7 is depressed at 19 to receive the end of the screw 12 in clamping the block in place in the channeled end of the casing and handle part.

The block or head 7 has an opening 20 extending therethrough, and extending into and swingable in this opening 20 is a stem 21 of metal or other suitable material pivoted at 22 to the block 7. The stem 21 may be either flexible or stiff. The end of the stem 21 which is disposed adjacent the handle and casing part 5 has a socket 23 which fits around the adjacent end of the vibrating arm 14 when the head 7 is applied to the casing and handle part. The engagement of the vibrating arm 12 in the socketed end 23 of the stem 21 provides an operating connection which, when the toothbrush and its attachment head are applied to the casing and handle part and the switch 15 turned on, oscillates the stem 21 rapidly about the pivot 22.

The toothbrush 6 is mounted upon the other end of the stem 21 in such position that the oscillation or vibration of the stem 21 will produce a uniform and rapid up and down reciprocation and thereby a uniform and rapid up and down brushing effect of the bristles 25 upon the teeth.

The particular toothbrush 6 shown comprises the bristle carrying head which is socketed at 26 to receive the adjacent end of the stem 21. Means other than the socketed mounting may be provided for securing the toothbrush 6 upon the stem 21, but in any event, the mounting is preferably detachable so that the toothbrush part may be replaced at will. The rapid up and down vibration of the toothbrush as shown in Figure 5 is produced simultaneously with the usual back and forth movement of the brush across the teeth.

One corner of the block 7 is removed as shown at 30 to clear the pin 30', and the end of the block which is presented to the base of the channel 10 has sockets 32 (Figure 3) for receiving the spring-pressed pins 18 where the casing and handle part is also adapted for use with a razor head as herein described.

To protect the electric motor within the casing and handle part 5 from the water used in brushing the teeth, the stem 21 is preferably provided with a rubber protector 35. This protector 35 has an opening 36 which slips on over the stem 21, and with the protector applied as shown, water is prevented from reaching the electrical parts within the casing and handle part 5.

In the embodiment shown in Figures 5 and 6, the toothbrush 6' is mounted upon the outer end of the stem 21' as in the preceding embodiment of the invention. The stem 21' is preferably provided with a protector similar to the protector 35 of the preceding embodiment of the invention. Also, as in the preceding embodiment, the block 7' has an opening 20' extending therethrough, and the stem 21' extends into this opening 20' and is swingable therein on a pivot 22'.

The handle and casing part 5' of Figures 5 and 6, however, is the casing and handle part of a "Packard" type electric razor which has its motor 8' disposed with its shaft 38 longitudinally of the handle and casing part. The end of the shaft 38, which is presented to the head or block 7', extends into the opening 20' when the head 7' is inserted in the channeled end 10' of the casing and handle part and secured therein by the screw 12', and has an eccentric pin 40 which engages a socketed or otherwise suitably formed end 41 of the stem 21' to oscillate the stem 21' rapidly about its pivot 22' when the starting element or a suitable switch 15' is operated to start the motor. The operation of the device shown in Figures 5 and 6 is otherwise the same as the operation of the preceding embodiment of the invention.

I do not intend to be limited to the precise details shown or described.

I claim:

1. An attachment for use with a handle part enclosing an electric motor and provided with a transversely channeled end and an actuating element driven by said motor, said attachment comprising an attachment member having a generally rectangular end formed to fit in the transversely channeled end of said handle part, a stem pivoted to said attachment member and having an end terminating in proximity to the channeled end of said handle part and provided with means for operative connection with said actuating element when said attachment member is applied to said handle part, said stem projecting from the attachment-member at its opposite end and an implement mounted upon the projecting end of said stem and vibrated by oscillation imparted to said stem by said actuating element.

2. An attachment for use with a handle part enclosing an electric motor and provided with a transversely channeled end and an actuating element driven by said motor, said attachment comprising an attachment member having a generally rectangular end formed to fit in the transversely channeled end of said handle part and having an opening extending therethrough to receive at one end the adjacent end of said actuating element when said attachment member is applied to said handle part, a stem disposed in said opening and pivoted to said attachment member, said stem having an end terminating in proximity to the channeled end of said handle part and provided with means for operative connection with said actuating element and projecting from said attachment member at its opposite end and an implement mounted upon the projecting end of said stem and vibrated by oscillation imparted to said stem by said actuating element.

3. An attachment for use with a handle part enclosing an electric motor and provided with a transversely channeled end and an actuating element driven by said motor, said attachment comprising a generally flat-sided block having an opening extending therethrough, said block having a generally rectangular end adjacent one end of said opening and adapted to fit in the transversely channeled end of said handle part, a stem disposed in said opening and pivoted to said block, said stem terminating at one end in proximity to the square end of said block and projecting from said block at its opposite end, and an implement mounted upon the projecting end of said stem and adapted to be vibrated by oscillation of said stem.

4. An attachment for use with a handle part enclosing an electric motor and provided with a transversely channeled end and an actuating element driven by said motor, said attachment comprising an attachment member having a generally rectangular end formed to fit in the transversely channeled end of said handle part, a stem supported for swinging movement by said attachment member and provided with means for operative connection with said actuating element when said attachment member is applied to said handle part, said stem projecting from the attachment member at its opposite end, and an implement mounted upon the projecting end of said stem and actuated by movement imparted to said stem by said actuating element.

5. An attachment for use with a handle part enclosing an electric motor and provided with a transversely channeled end and an actuating element driven by said motor, said attachment comprising a member having an opening extending therethrough, said member having a generally rectangular end adjacent one end of said opening and adapted to fit in the transversely channeled end of said handle part, a stem disposed in said opening and supported for swinging movement by said attachment member, said stem having means for operative connection with said actuating element when said member is applied to said handle part, said stem projecting from said member at its opposite end, and an implement mounted upon the projecting end of said stem and actuated by movement imparted to said stem by said actuating element.

6. An attachment for use with a handle part enclosing an electric motor and provided with a transversely channeled end and an actuating element driven by said motor, said attachment comprising an attachment member having a generally rectangular end formed to fit in the transversely channeled end of said handle part, a stem pivoted to said attachment member for swinging movement about an axis and in a single plane, said stem being provided with means for operative connection with said actuating element when said attachment member is applied to said handle part, said stem projecting from the attachment member at its opposite end, and an implement mounted upon the projecting end of said stem and oscillated in a single plane by swinging movement imparted to said stem by said actuating element.

7. An attachment for use with a handle part enclosing an electric motor and provided with a transversely extending end and an actuating element driven by said motor, said attachment comprising an attachment member having a generally rectangular transversely extending end formed to fit against the transversely extending end of said handle part, a stem supported for swinging movement by said attachment member and provided with means for operative connection with said actuating element when said attachment member is applied to said handle part, said stem projecting from the attachment member at its opposite end, and an implement mounted upon the projecting end of said stem and actuated by movement imparted to said stem by said actuating element.

MERRITT W. GANO, Jr.